INVENTOR.
Frank A. Leisey
By Everett A. Johnson
attorney.

March 15, 1960 F. A. LEISEY 2,928,775
AMPEROMETRIC-COULOMETRIC TITRATION SYSTEMS
Filed May 31, 1956 3 Sheets-Sheet 2
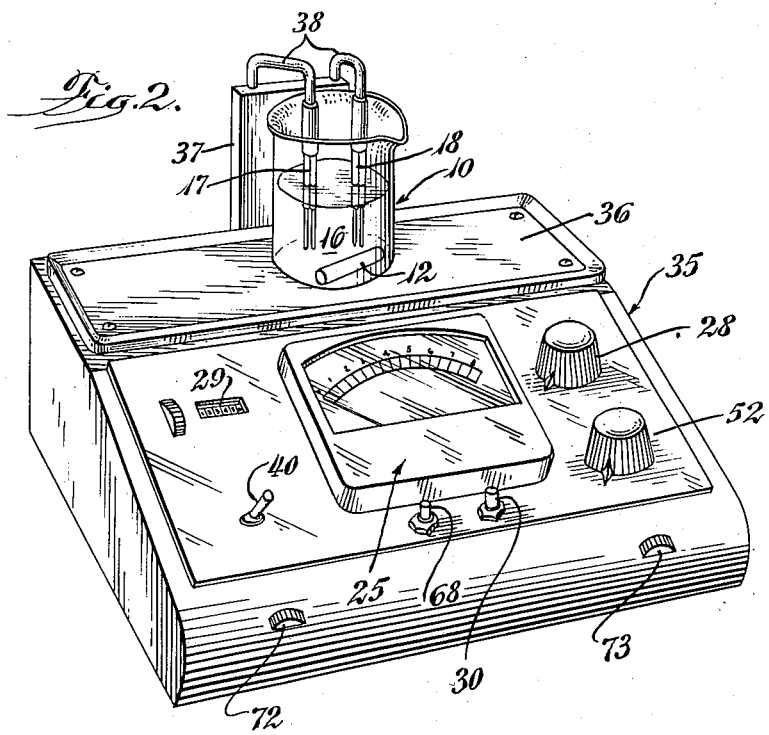
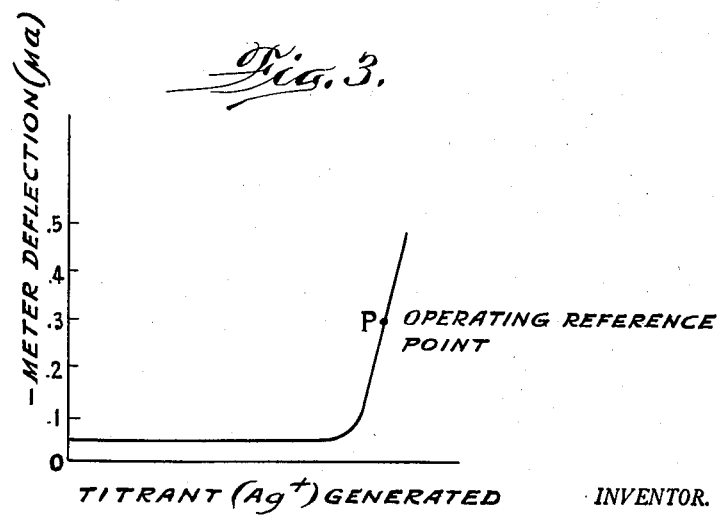

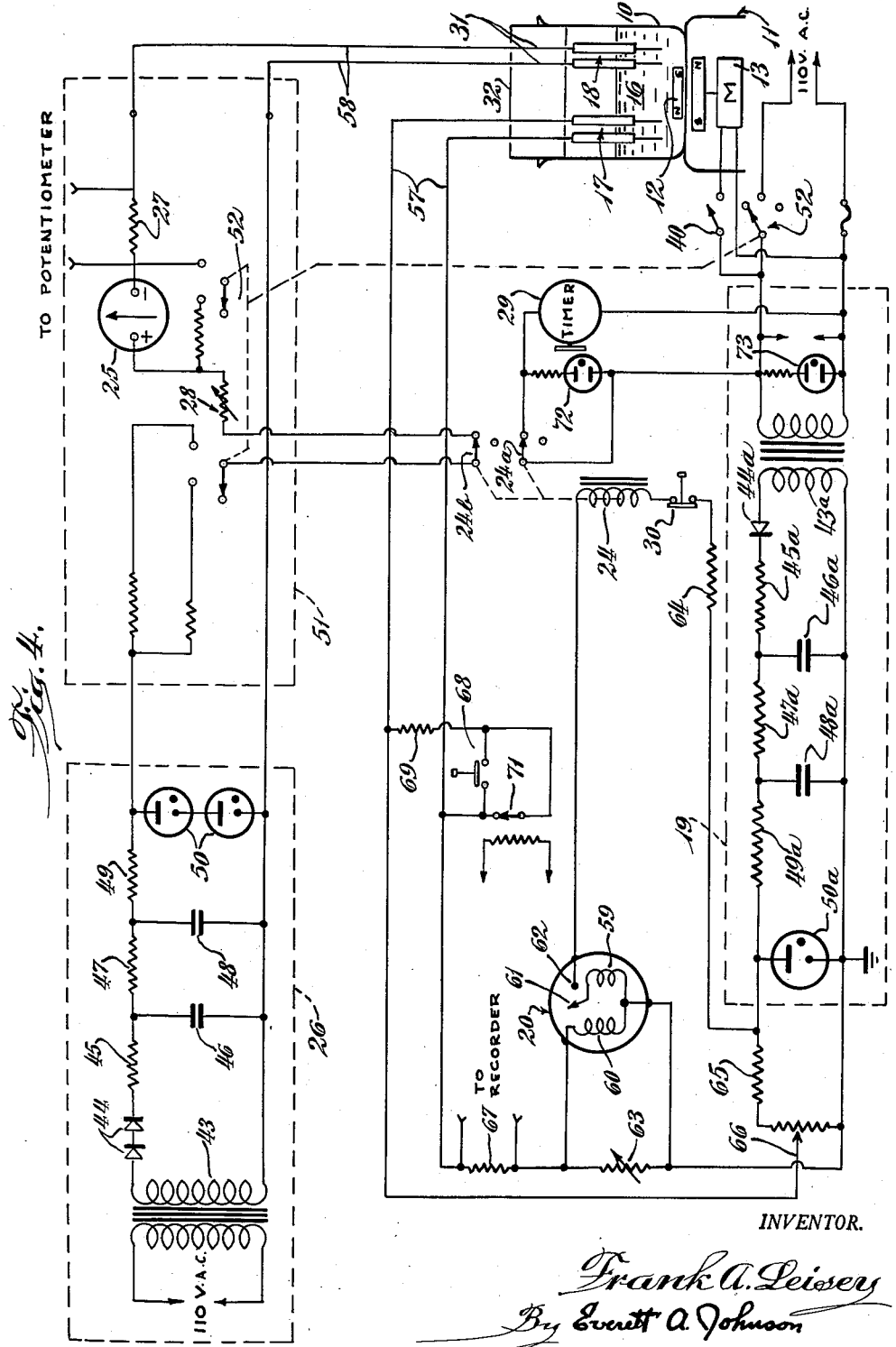

United States Patent Office 2,928,775
Patented Mar. 15, 1960

2,928,775

AMPEROMETRIC-COULOMETRIC TITRATION SYSTEMS

Frank A. Leisey, Chicago, Ill., assignor to Standard Oil Company, Chicago, Ill., a corporation of Indiana Application May 31, 1956, Serial No. 588,521

2 Claims. (Cl. 204—1)

This invention relates to method and apparatus for automatic titration and specifically for determining mercaptan sulfur, trace unsaturation, and the like, in hydrocarbons by coulometric titrations.

In many processes it is important to measure quantitatively the proportion of known contaminants. For example, the efficient operation of petroleum refinery treating plants that remove mercaptan sulfur from light petroleum stocks requires a constant check on the mercaptan content of the product. Most methods of determining mercaptans have heretofore been based on a titration with volumes of an aqueous or alcoholic silver nitrate solution. The measurement of the mercaptan content was accomplished by volumetric analysis involving the addition to the test solution of a reagent of known concentration in known quantity sufficient to produce a stoichiometric reaction with the mercaptan which is usually referred to as bringing the test solution to an endpoint. Knowing the concentration and the volume of the added reagent, the concentration of the mercaptan could be ascertained. Such a method required the preparation, standardization, storage, controlled introduction and precise measurement of volumetric reagents.

Addition of bromine to double bonds is widely used in the petroleum industry as a measure of unsaturation of hydrocarbons. Bromination methods of measuring unsaturation differ mainly in the reagent used and in the detection of the end point. Bromine in various solvents and bromate-bromide solution are the common reagents. Results are reported either as bromine number—the grams of bromine that will add to 100 grams of sample—or as bromine index—the milligrams of bromine that will add to 100 grams of sample.

The preparation of reliable standard solutions for determining mercaptan number and bromine index involves the expenditure of considerable effort and frequently the operator must employ indirect and time-consuming techniques. Furthermore, the changes in such solutions which often take place with the passage of time change the characteristics of the reagent. Likewise, the difficulty in making precise measurement of the solution and failure to control the addition of the reagent introduced errors. These and other disadvantages tend to make the volumetric systems unreliable and not adaptable for plant control.

Electrical methods have been devised for determining the titration end point but such still required adding volumetric titration reagents. Furthermore, each such method involved careful manipulation of volumetric reagents and interpretation of results by a highly skilled operator and was not adaptable to the determination of unusually low concentrations ordinarily involved or to routine analyses.

It is, therefore, a principal object of my invention to provide the titrating reagent in a manner which is controllable and reproducible and which avoids the difficulties inherent in any liquid volumetric system. Another object of my invention is to provide a method and means for the titration of mercaptans or the determination of unsaturation in hydrocarbons which eliminates the preparation, standardization, storage, and controlled introduction and measurement of volumetric reagents.

It is a further object of my invention to minimize the number of steps required for making a determination and in addition it is an object to eliminate any need for standardized reagents and to avoid the difficulties resulting from the use of volumetric reagents.

Another object of my invention is to provide a method and means which lends itself readily to automatic control and regulation. More specifically, it is an object of my invention to provide an electrical method and system for generating reagents and for detecting the end point in a simple, accurate and rapid manner. A further object is to provide a method and system where the use of a liquid reagent is eliminated, titrations are rapid, and wherein unusually low concentrations of unsaturates can be measured. These and other objects of my invention will become apparent as the description thereof proceeds.

Briefly, my invention employs a coulometric system of electrically generated reagents within a titration cell and an amperometric system including a meter-relay circuit for detecting the end point.

When a mercaptan titration is conducted, silver ions are generated by a first pair of metal electrodes suspended in the titration cell. A constant direct current passed through the cell via these electrodes generates silver ions by oxidizing the anode. The generation time under these conditions is directly proportional to the silver ions produced.

When the system is used for determining trace unsaturation in hydrocarbons, bromine is generated in the titration cell to react with the unsaturated compounds in the sample. The end point is detected by a reference current, and the generation time determines the bromine index of the sample. Because bromine is released at a constant low rate rather than in the concentrated pulses common to manual volumetric titration, side reactions are minimized.

A second pair of metal electrodes in the titration cell are connected to the relay-meter circuit. Initially the meter deflection is small but a rapid increase occurs when excess bromine or silver ions are present in the titration cell, the excess titrant producing a diffusion current which is characteristic of the excess present. At a preselected diffusion current a relay is activated, the relay turning off the generation current to the first pair of electrodes and stops an electrical timer. The mercaptan content or the bromine index of the sample, is proportional to the readings on the timer or counter.

Further details of the invention will be described in connection with embodiments of the apparatus illustrated by the accompanying drawings wherein:

Figure 2 is a perspective of an assembly embodying my invention;

Figure 3 is a representation of a typical deflection curve indicating the presence of excess titrant ion; and Figure 4 is a circuit diagram showing in more detail the electrical components of the apparatus embodied in Figure 1.

Figure 1:
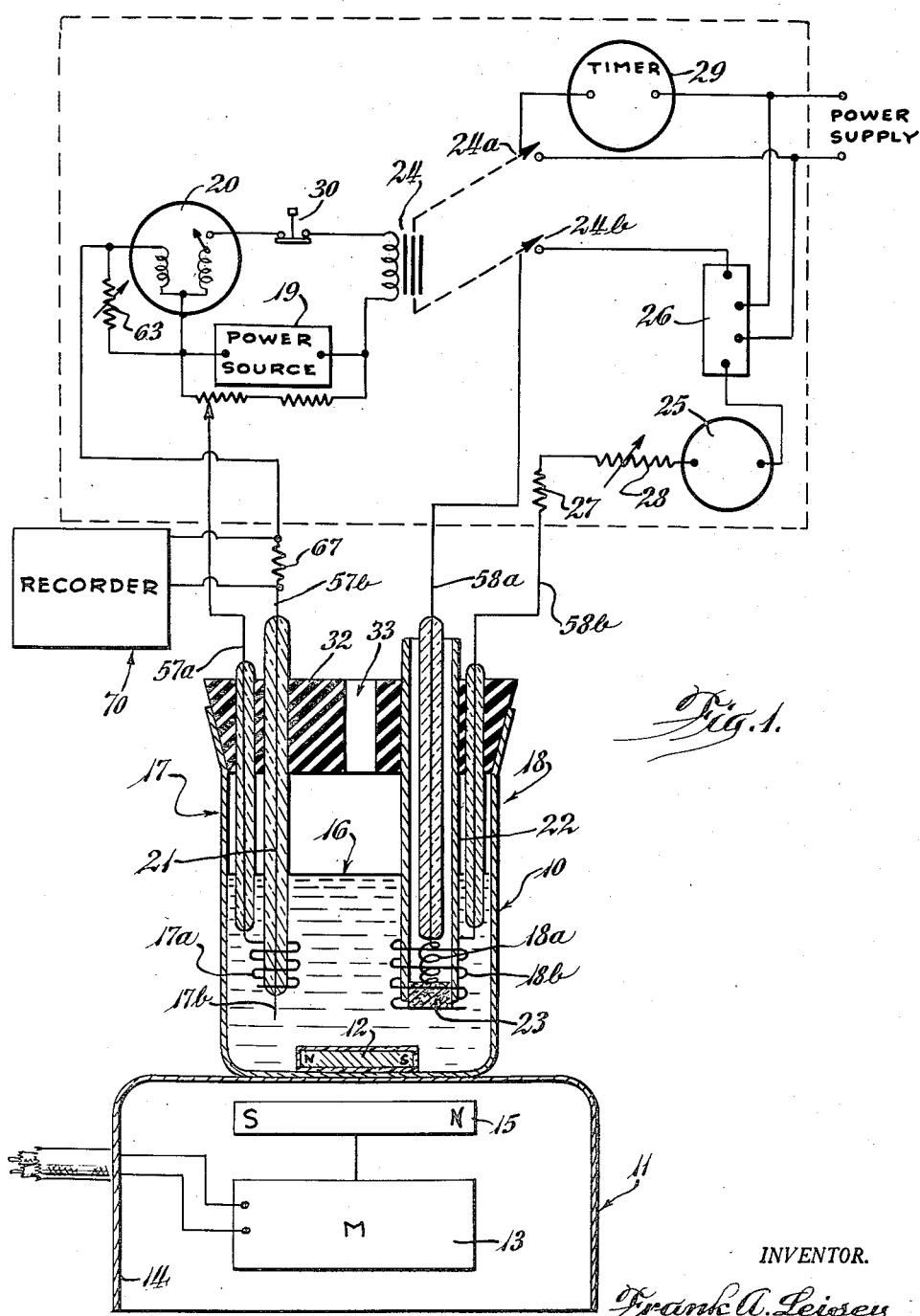
Figure 1 is a schematic diagram of my titration apparatus.

Referring to Figure 1 in the drawings, the titration cell 10 is illustrated as a 100 milliliter beaker. This is placed on a magnetic stirrer 11 with which the Teflon-covered magnetic rod 12 is driven to agitate the titration mixture. The magnetic stirrer 11 is of the type wherein a constant speed motor 13 within the housing 14 drives a magnetized bar 15. When the driven bar 15 and the free stirring rod 12 are magnetically coupled, a swirling action is imparted to the electrolyte 16 within the cell 10.

In making a bromine index determination the solvent electrolyte 16 placed in the cell 10 is comprised essentially of 30 milliliters glacial acetic acid, 13 milliliters methanol, 7 milliliters potassium bromide, and 0.1 gram mercuric acetate or mercuric chloride.

Within the cell 10 are mounted two pairs of electrodes 17 and 18. The first pair of detection electrodes 17 comprises a cathode 17b and an anode 17a connected in series with a direct current source 19 of 0.1 to 0.5 volt and with a meter 20 having a sensitivity of about 1 microampere per division. The electrodes 17a and 17b may be 20-gauge platinum wires. The cathode 17b consists of a 1-cm. wire sealed in the bottom of a 6 mm. glass tube 21. The anode 17a is a 3-cm. spiral around the lower portion of the tube 21.

The ion-generating system includes the pair of generating electrodes 18, also of 20-gauge platinum wire. The anode 18a consists of a 10-cm. wire spiral wound around the lower portion of an 8-mm. glass tube 22 open at the bottom. The cathode 18b is a 5-cm. spiral positioned inside the tube 22 about 3 mm. from the bottom. A plug of glass wool 23 isolates the cathode 18b.

The generating electrodes 18 and the detecting electrodes 17 are spaced from each other as far as possible in the titration cell 10. It is contemplated, however, that we may provide an annular cell in which instance the electrode pairs 17 and 18 may be more closely spaced with the positive flow of electrolyte solution being successively passed through the detecting electrodes 17 and then the generating electrodes 18.

The generating electrode pair 18 is connected in series with contacts 24b of the relay 24, a milliammeter 25, a constant direct current source 26, precision resistor 27 and an adjustable rheostat 28. This circuit maintains the generator current constant since the generator cell resistance, and any change in cell resistance as the titration proceeds due to changing electrolyte conductance and cell polarization, is very small in comparison to the high resistance of series rheostat 28. In the cell assembly described above, the value of rheostat 28 is greater than 100 times the resistance of the generator cell and the change in cell resistance has been found to be less than $\frac{1}{10}$ the generator cell resistance. Rheostat 28 has been made adjustable so that any desired coulometric current up to 10 milliamperes can be selected. Small variations in the conductance of fresh batches of the electrolyte 16 and in the spacing of the electrodes 18a and 18b do not change the generating current.

The synchronous timer 29 is connected in series with contacts 24a of relay 24 and the power line. Pressing the titration push button switch 30 de-energizes relay 24 whose contacts 24a and 24b then start the ion-generating current across electrodes 18 and the synchronous timer 29.

Two coulometric current ranges, for example, set at 1 and 5 milliamperes, can be provided in the titrator circuit. By employing the two ranges, I may obtain better control in the low bromine index range and decreased titration time in the high bromine index range.

In Figure 4, an apparatus component adapted for use in mercaptan titrations when employed with the electrical circuit of Figures 1 and 4 is shown. In its operation the solvent electrolyte 16 placed in the cell 10 is comprised essentially of 100 milliliters 95% ethanol, 50 milliliters benzene, approximately 0.5 gram ammonium or sodium nitrate (which may be 5 milliliters of a 1 molar aqueous solution), and 2 milliliters ammonium hydroxide.

Within the cell 10 are mounted two pairs of electrodes 17 and 18. The first pair of detection electrodes 17 comprising an anode 17a and a cathode 17b which may be connected in series with direct current source 19 of 0.1 to 0.5 volt and with a meter 20 (Figure 1) having a sensitivity of about 0.03 microampere per division. The electrodes 17a and 17b may be platinum and gold wires, respectively, 3 millimeters in diameter, spaced about 5 millimeters apart, and exposed to the electrolyte 16 in cell 10 for a depth of 35 millimeters.

The ion-generating system includes the pair of generating electrodes 18, the anode 18a being of silver and the cathode 18b suitably being of platinum. The generating electrodes 18 are of the same size, have the same exposed length and have the same spacing as defined in connection with the detecting electrodes 17.

Sleeves 31 cover the upper portion of each of the electrodes in pairs 17 and 18 (Figure 4) and extend below the surface of the electrolyte 16 thereby eliminating fluctuating galvanometer currents due to changing the effective electrode area as the electrolyte 16 is stirred. A suitable material for the sleeves 31 is a vinyl plastic coating.

During the course of a tritration, the current in the amperometric detection system changes as shown in Figure 3. Once the increase in the deflection of meter 20 occurs, the end point has already been exceeded and a small error would be introduced into the determination. To eliminate this error and to make the system automatic, the reference current method mentioned above is used. Thus, before the sample is introduced into cell 16 titrant ions are generated by electrode pair 18 until an arbitrary deflection of approximately 0.3 microampere is reached, such as point P in Figure 3. This corresponds to a blank run. The sample is then introduced into cell 10 and the mixture is again automatically titrated to this point. This procedure minimizes any titration error and eliminates the effects of different initial detector currents due to variations in the composition of the electrolyte 16.

Referring to Figure 2, the case or cabinet 35 encloses circuitry and a magnetic stirrer assembly equivalent to that schematically shown in Figures 1 and 4. The beaker 10 is placed on ledge 36 and the jacks of electrode holder 37 plugged into sockets (not shown) at the back of the cabinet 35. This places the electrode pairs 17 and 18 within the beaker 10.

The holder 37 accommodates a four-pin electric connector (not shown), the leads from which pass through two conduit arms 38 which in turn support the electrode pairs 17 and 18. The arms 38 can be rotated in holder 37 to adjust the relative spacing of the electrode pairs and the spacing of the electrodes from the walls of the beaker 10.

To conduct a titration employing the apparatus of Figure 2, the electrolyte 16 is placed in beaker 10 and the electrode assembly 17–18 is inserted by connecting holder 37 to the chassis 35. The titration power is turned on by switch 52 and the stirrer 11 initiated by means of control 40. The speed of stirring is such that the electrolyte 16 in beaker 10 is well agitated without entraining air bubbles.

Prior to introducing any sample into the beaker 10 and immediately before each determination, the titration button 30 is depressed. Titrant ions are generated in the electrolyte 16 within the beaker 10 until a desired fixed reference concentration is reached where the titrant generation is automatically stopped. A sample of 1 ml. is then pipetted into the titration cell 10 and the titration button 30 again depressed. When the timer 29 stops, the mercaptan sulfur content or bromine index, etc. of the sample can be calculated. However, for a given sample size, the generation current can be adjusted so that the timer 29 will read the number or index directly. For all samples, the coulometric current and the sample size can be selected so that a titration can be completed in 2 to 5 minutes.

The automatic coulometric titrator using the meter-relay circuit has a number of advantages over the galvanometer-relay circuit described in my co-pending application Serial No. 377,544, filed Aug. 13, 1953. The meter-relay is more rugged and less subject to vibration effects than the galvanometer. Furthermore, it is more easily adjusted and eliminates the need for the light source, optical system, phototube, relay tube, and their adjustment, thereby greatly simplifying the circuitry. These features make it more desirable for a commercial instrument.

Figure 4 shows a schematic diagram of the automatic coulometric titrator employing a meter-relay system. The power supplies 19 and 26 each contains an isolation transformer 43, selenium rectifier 44, current surge resistor 45, resistance-capacitance filter comprising elements 46, 47, 48 and 49, and voltage regulator tubes 50. Power supply 26 has an output voltage of 216 volts which is twice that of power supply 19, hence the double rectifier and additional voltage regulator tube.

The coulometric current control and measuring means 51 includes the high-low current selector switch 52, current adjustment rheostat 28, coulometric current measuring meter 25, precision resistor 27, and connections 58 which conduct the generation current to the electrodes in the titration cell. The voltage drop across the precision resistor 27 is measured by an external potentiometer used to accurately calibrate and check meter 25.

The locking coil 59 of the meter-relay 20 is wound over the meter current coil 60 and rotates with it when current passes through meter coil 60. Locking coil 59 carries a pointer and contact 61. A stationary contact 62 is adjustable to the reference current value and can be pre-set to any desired position over the operating range of the meter-relay 20. Adjustment of resistor 63 can likewise adjust the reference current value and can extend the operating range of the meter-relay 20.

When the reference current flows via connections 57a and 57b through the indicator electrode circuit, the meter coil 60 deflects sufficiently to cause contact 61 to touch contact 62. The locking circuit is thereby completed and current from power supply 19 passes through the locking coil 59, contacts 61 and 62, relay 24, titrate switch 30, current limiting resistor 64, and back to the positive side of the power supply 19. The current flow through the locking coil 59 is such as to hold contacts 61 and 62 together and keep relay 24 energized. Relay 24 operates contacts 24a and 24b which stops the coulometric generation current and electrical timer 29, respectively. Meter coil 60 has now lost control and a decrease in indicator current will not cause contacts 61 and 62 to open. Only when the titrate switch 30 is momentarily opened does meter coil 60 regain control.

Polarizing voltage for the indicator electrodes 17 comes from power supply 19 through a voltage divider network consisting of resistor 65 and adjustable potentiometer 66. Any polarizing voltage from 0 to 0.5 volt can be selected. The voltage drop across resistor 67 in the indicator circuit can be connected to an external recorder 70 for plotting indicator current vs. titration time curves.

The normally open momentary contact stop switch 68 is used to stop a titration prematurely for adjustment purposes or if mistakes have been made in selecting too large of a sample size and it is desired to stop the titration. This circuit operates by shunting the indicator electrodes 17 with resistor 69 which passes a high current through the meter coil 60 causing it to deflect to the locked position. The thermal delay switch 71 is used to automatically put the titrator in this stop position when the instrument is first turned on.

Typical operation of the meter-relay circuit with platinum-gold indicator electrodes 17 and silver generation electrodes 18 for the titration of mercaptans is as follows:

A polarizing voltage of 0.25 volt is applied by adjusting potentiometer 66. The platinum electrode 17a is connected to 57a which is positive with respect to the gold electrode connected to 57b. The electrodes 17 are immersed in an alcoholic electrolyte containing aqueous sodium nitrate solution. A small current will flow through the electrode circuit, resistor 67, meter-relay coil 60, and back to the direct current power supply 19. The titrate switch 30 is depressed momentarily and relay 24 becomes de-energized. This causes contacts 24a and 24b to close, applying the coulometric generation current from power supply 26 to the silver generation electrodes 18 via leads 58a and 58b and operating the electrical timer 29.

The amount of current flowing in the generation circuit depends on the range switch position 52 and current adjustment rheostat 53 and is measured by meter 25. Silver ions are then generated in the electrolyte 16. The generation current will flow until the indicator electrode current rises to the pre-set reference cut-off value. The rise in indicator current is due to the characteristics of the indicator electrodes which show a rise in indicator diffusion current due to the excess silver ions in the electrolyte. When the indicator current reaches the reference value, the meter-relay contact 61 will touch contact 62 and lock in place due to the current flowing through the locking circuit which energizes power relay 24. Relay 24 breaks contacts 24a and 24b to stop the coulometric generation current and timer 29.

A weighed sample of mercaptan can now be introduced and the timer 29 reset to zero. The titrate switch 30 is now pressed and silver ions again generated until the same reference indicator current (same silver ion concentration in the titration cell) is reached, at which point the meter-relay 20 again causes relay 24 to become de-energized thereby stopping the titration. The mercaptan content of the sample is calculated from the sample size, generation current, and titration time.

Meter-relay circuit means can also be used for performing bromine index titrations described in connection with Figure 1. No changes in circuitry components are necessary, the only changes made being in the electrode system. Also, a suitable solvent electrolyte containing potassium bromide is used in which the bromination of the sample can take place. An indicating electrode polarizing voltage is adjusted to 0.2 volt and the titration cell reference current operating point is adjusted between 10 to 20 microamperes by resetting the meter-relay 20.

Batch titrations have been described, but the instrument can titrate a flowing plant stream, automatically monitor instantaneous changes, make a continuous record of the reactive constituents of plant streams. Thus, 1 milliliter sample of a plant stream may be taken at about five-minute intervals and introduced into a titration cell operated in principle as described above. Any deviations from the selected reference level would in turn be reflected by changes in the titration time. These changes in titration time can be converted into electrical impulses for controlling pumps, plant process flows, etc.

A wide-range versatile titrator adaptable to a large number of coulometric titration problems has been described by providing adjustable components. A wide range of adjustment of the reference current operating point can be achieved and the titrator is adaptable for use with any amperometric end-point titration in which the titrant ion can be coulometrically generated. Indicator electrodes are selected on the basis of providing the greatest sensitivity to the ion being generated.

The range of coulometric generation current can readily be increased by adjustment to provide for higher generation rates, for example 100 milliamperes. The voltage applied to the generation electrodes can readily be reversed so that reduction of metallic ions which occurs at the cathode can be utilized. Where the ion is being generated from the electrolyte, platinum electrodes are preferred.

This application is a continuation-in-part of my co-pending application Serial No. 377,544, filed August 31, 1953, and entitled "Automatic Apparatus for Mercaptan Titration," my co-pending application Serial No. 564,572, filed February 9, 1956, and entitled "Automatic Titrator," and my co-pending application Serial No. 566,830, filed February 21, 1956, and entitled "Detecting Electrode for Coulometric Titrations."

Although I have described my invention in terms of particular forms of apparatus, it should be understood that this apparatus, and the described examples of operation, are by way of illustration only and that my invention is not limited thereto. Accordingly, it is contemplated that those skilled in the art will make modifications in the apparatus and mode of operation in view of my disclosure without departing from the spirit of the invention.

What I claim is:

1. In quantitative analysis by titration involving the quantitative reaction in an electrolyte of a titrating agent with unsaturated hydrocarbons to be analyzed, the improvement which comprises regulating the amount of titrating agent present in the electrolyte by electrolytically generating bromine in situ, establishing a reference point of bromine concentration in said electrolyte, introducing the unsaturated hydrocarbons to be analyzed, controlling the current employed in the electrolysis so as to effect the generation of the bromine at a constant rate, amperometrically sensing the presence of said reference point of bromine concentration as an indication of the completion of the titration of said unsaturated hydrocarbons, and determining the time necessary to complete such titration.

2. The method of utilizing the time of generation of a titrating agent comprising bromine at a constant rate for quantitative determination of a known reactive constituent comprising unsaturated hydrocarbons in solution which comprises establishing a preselected concentration of bromine in a titrating zone, introducing a measured sample of unsaturated hydrocarbons in unknown concentration into the titrating zone, coulometrically generating bromine in said titrating zone at a constant rate, said bromine being reacted with the said unsaturated hydrocarbons until all of said hydrocarbons have reacted therewith and the preselected concentration of bromine is again present, amperometrically detecting the presence of such preselected concentration of bromine, terminating the generation of bromine upon such detection of the preselected concentration of bromine, and determining the length of time that such generation of bromine took place, whereby the duration of such titration can be expressed in terms of the concentration of the unsaturated hydrocarbons.

References Cited in the file of this patent

UNITED STATES PATENTS

| | | |
|---|---|---|
| 2,621,671 | Eckfeldt | Dec. 16, 1952 |
| 2,651,612 | Haller | Sept. 8, 1953 |
| 2,805,191 | Hersch | Sept. 3, 1957 |
| 2,832,734 | Eckfeldt | Apr. 29, 1958 |

OTHER REFERENCES

Lundell et al.: Outlines and Methods of Chemical Analysis, John Wiley & Sons, New York, Jan. 3, 1938, pp. 163–164.

Ramsey et al.: Anal. Chem., vol. 22, 1950, pp. 332–335.

De Ford et al.: Anal. Chem., vol. 23, pp. 938–940, July 1951.

"Analytical Chemistry," vol. 19 (1947), pp. 197–200, article by Sease et al.; also vol. 23 (1951), pp. 941–944, article by De Ford et al.